United States Patent
Shetty et al.

(10) Patent No.: US 11,722,474 B2
(45) Date of Patent: Aug. 8, 2023

(54) EMBEDDING CONTENT IN AUDIO CONTENT THROUGH A VOICE ASSISTANT

(71) Applicant: VMWARE, INC., Palo Alto, CA (US)

(72) Inventors: Rohit Pradeep Shetty, Bangalore (IN); Sheetal Deenadayalan, Bangalore (IN); Pon Venkatesh M, Bangalore (IN)

(73) Assignee: VMWare, Inc., Palo Alto, CA (US)

( * ) Notice: Subject to any disclaimer, the term of this patent is extended or adjusted under 35 U.S.C. 154(b) by 398 days.

(21) Appl. No.: 16/903,412

(22) Filed: Jun. 17, 2020

(65) Prior Publication Data

US 2021/0344666 A1 Nov. 4, 2021

(30) Foreign Application Priority Data

Apr. 30, 2020 (IN) .............................. 202041018500

(51) Int. Cl.
*H04L 9/40* (2022.01)
*G10L 19/018* (2013.01)

(52) U.S. Cl.
CPC ........ *H04L 63/0815* (2013.01); *G10L 19/018* (2013.01); *H04L 63/102* (2013.01)

(58) Field of Classification Search
CPC ............... H04L 63/0815; H04L 63/102; H04L 63/0861; H04L 2463/082; H04L 63/107; G10L 19/018; G06F 3/167
See application file for complete search history.

(56) References Cited

U.S. PATENT DOCUMENTS

| | | | | |
|---|---|---|---|---|
| 8,612,534 | B1 * | 12/2013 | Hossack | H04L 67/14 |
| | | | | 709/206 |
| 10,374,816 | B1 * | 8/2019 | Leblang | H04M 3/563 |
| 10,452,345 | B1 * | 10/2019 | Coburn, IV | H04L 12/2805 |
| 10,867,129 | B1 * | 12/2020 | Fregly | G06F 40/40 |
| 11,122,423 | B2 * | 9/2021 | Stuntebeck | G06Q 10/1095 |
| 11,175,880 | B2 * | 11/2021 | Liu | G10L 15/22 |
| 11,189,280 | B2 * | 11/2021 | Kunnath | G10L 15/30 |
| 11,189,291 | B2 * | 11/2021 | Panchapakesan | H04L 9/0825 |
| 11,482,231 | B2 * | 10/2022 | Shetty | G10L 17/24 |
| 11,509,479 | B2 * | 11/2022 | Kunnath | H04L 9/3231 |
| 11,538,483 | B2 * | 12/2022 | Shetty | G06Q 10/103 |
| 11,570,165 | B2 * | 1/2023 | Xuan | H04L 63/0853 |
| 2014/0244712 | A1 * | 8/2014 | Walters | G06Q 10/10 |
| | | | | 709/202 |
| 2014/0364092 | A1 * | 12/2014 | Rose | G06F 16/433 |
| | | | | 455/414.1 |
| 2016/0182572 | A1 * | 6/2016 | Qin | H04L 65/1104 |
| | | | | 370/475 |

(Continued)

*Primary Examiner* — Gary S Gracia
(74) *Attorney, Agent, or Firm* — Thomas | Horstemeyer, LLP

(57) ABSTRACT

Disclosed are various approaches for authenticating a user through a voice assistant device and creating an association between the device and a user account. The request is associated with a network or federated service. The user can use a client device, such as a smartphone, to initiate an authentication flow. A passphrase is provided to the client device can captured by the client device and a voice assistant device. Audio captured by the client device and voice assistant device can be sent to an assistant connection service. The passphrase and an audio signature calculated from the audio can be validated. An association between the user account and the voice assistant device can then be created.

13 Claims, 5 Drawing Sheets

(56) References Cited

U.S. PATENT DOCUMENTS

| | | | | |
|---|---|---|---|---|
| 2017/0329573 A1* | 11/2017 | Mixter | | H04M 1/271 |
| 2018/0225012 A1* | 8/2018 | Bates | | G06F 21/30 |
| 2018/0343481 A1* | 11/2018 | Loheide | | H04N 21/47815 |
| 2019/0165937 A1* | 5/2019 | Funane | | G06F 21/32 |
| 2019/0258704 A1* | 8/2019 | Mertens | | G10L 15/22 |
| 2019/0288657 A1* | 9/2019 | Arunachalam | | G06F 16/635 |
| 2019/0310820 A1* | 10/2019 | Bates | | H04N 21/2143 |
| 2019/0318069 A1* | 10/2019 | Mitic | | H04W 12/04 |
| 2019/0318070 A1* | 10/2019 | Mitic | | G06F 21/31 |
| 2020/0084206 A1* | 3/2020 | Vaidya | | H04L 63/0861 |
| 2020/0225817 A1* | 7/2020 | Coffman | | G06F 3/0488 |
| 2020/0389314 A1* | 12/2020 | Kunnath | | H04L 9/3231 |
| 2020/0413155 A1* | 12/2020 | Yamagishi | | H04N 21/4348 |
| 2021/0027787 A1* | 1/2021 | Panchapakesan | | H04L 9/0825 |
| 2021/0034324 A1* | 2/2021 | Funayama | | G06F 3/167 |
| 2021/0035589 A1* | 2/2021 | Hicks | | H04W 36/18 |
| 2021/0065153 A1* | 3/2021 | Wang | | G06Q 20/4097 |
| 2021/0209710 A1* | 7/2021 | Shetty | | G06Q 50/265 |
| 2021/0272187 A1* | 9/2021 | Trainor | | G06F 9/547 |
| 2021/0280186 A1* | 9/2021 | Mahadeva | | G10L 15/22 |
| 2021/0344666 A1* | 11/2021 | Shetty | | G06F 3/167 |
| 2022/0116346 A1* | 4/2022 | Roberts | | G06F 9/451 |

* cited by examiner

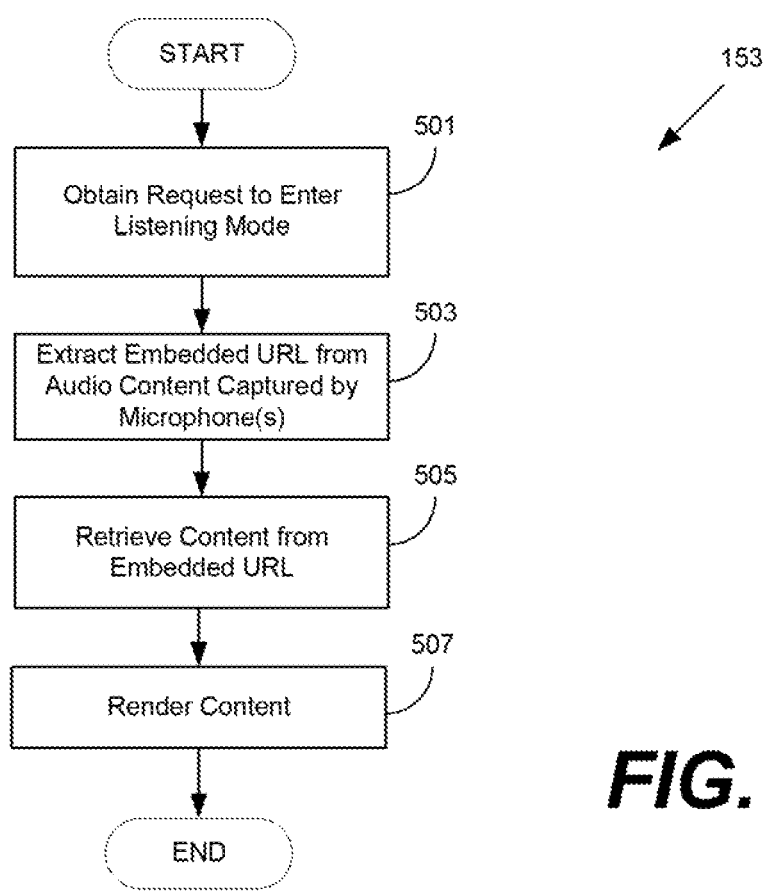

EMBEDDING CONTENT IN AUDIO CONTENT THROUGH A VOICE ASSISTANT

RELATED APPLICATIONS

Benefit is claimed under 35 U.S.C. 119(a)-(d) to Foreign application Serial No. 202041018500 filed in India entitled "EMBEDDING CONTENT IN AUDIO CONTENT THROUGH A VOICE ASSISTANT", on Apr. 30, 2020, by VMware, Inc., which is herein incorporated in its entirety by reference for all purposes.

BACKGROUND

In an enterprise setting, individuals can utilize a number of different devices, services, and applications that are provided by an enterprise. Some of these services are hosted in a third party environment and some can be hosted on servers operated by the enterprise. In some enterprise environments, voice assistant devices can be deployed in meeting rooms, offices, or other work areas for use by individuals in the office environment. Services can be configured to provide information to voice assistant devices for various use cases. In some examples, an assistant device might be used in a team environment to play back information associated with a meeting or other group setting. For example, an assistant device can be tasked with converting a meeting agenda from text to speech for the meeting attendees. However, the meeting attendees might have to use other mechanisms to obtain information about the meeting agenda on their personal devices. Additionally, the voice assistant device may not have the capability to authenticate the users with their respective service endpoints in a team environment.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

FIG. 5 is a flow chart depicting the operation of an example of a component of the client device of the network environment of FIG. 1.

DETAILED DESCRIPTION

Figure 1:
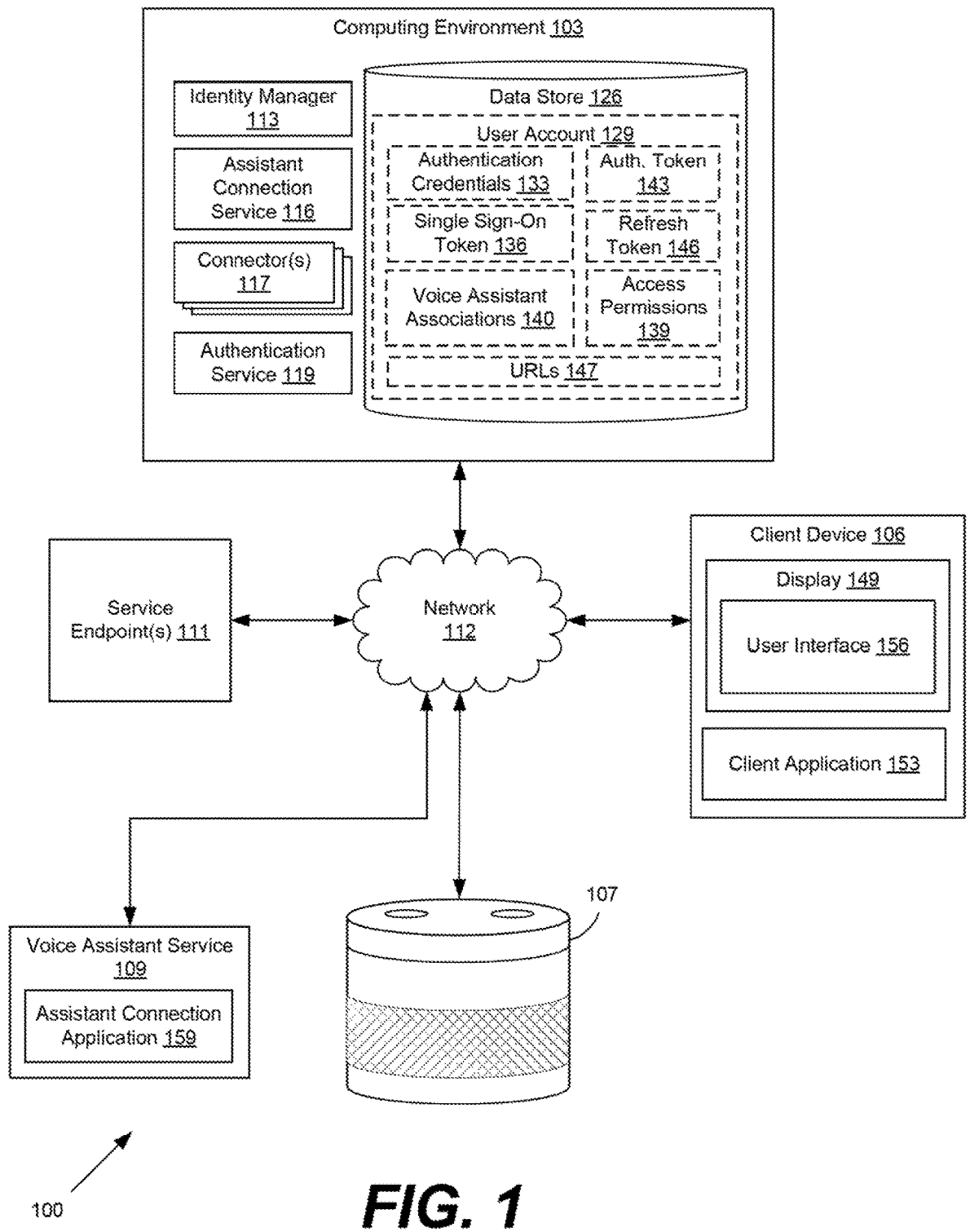
FIG. 1 is a schematic block diagram depicting an example of a network environment according to examples of the disclosure.

Disclosed are examples for encoding information, such as a uniform resource locator (URL) into information played back by a voice assistant device. The URL can link to an identity provider to which authentication for various service endpoints in federated. The URL can allow various participants in proximity to the voice assistant device to obtain the URL on a client device and access respective content at the URL. The respective content displayed to each client device can vary depending upon the user entitlements associated with the different privileges of the users. The client device can obtain the URL by being placed into a listening mode that listens for a URL that is inaudibly or imperceptibly embedded into audio that is played back by the voice assistant device. The URL embedding can be accomplished through steganographic methods or audio watermarking methods.

A user might have accounts in various services for which access is authenticated using an identity provider service utilized by the user's enterprise. For example, an enterprise can provide a third party email service, calendar service, customer relationship management (CRM) service, bug tracking service, task assignment service, and other enterprise services. The user can have an account with the enterprise that deploys an identity provider service to enable single sign-on (SSO) capability for users of the enterprise. The identity provider can verify the user's identity within the enterprise and provide an authentication token that can be used to authenticate the user's access to other services, which may or may not be hosted by the enterprise. As another example, a third party conferencing service with which the enterprise provides accounts for its users can authenticate users through an identity provider service.

In an environment in which voice assistant devices are becoming more ubiquitous, these devices are often used in group settings to play back audio and/or video content in such a setting. For example, the voice assistant device might be used to read a meeting agenda for a meeting of various people in an enterprise. In a single user setting, the voice assistant device might be used to read the user's emails, tasks, calendar items, or other data from a service endpoint. In either scenario, it might be useful to provide the user with additional content associated with the audio or video content that is being played back by the voice assistant device.

For example, an email that is being read aloud might link to a service endpoint or another website. The email might include a link to an item in a service endpoint for which access is authenticated by an enterprise identity provider. Requiring the user to retrieve the email or enter the link into his or her client device can provide a user experience that is disjointed from the audio that is being read aloud by the voice assistant device. A meeting agenda that is being read aloud by the voice assistant device might include links to a bug tracking service for a software development team as the agenda progresses through each agenda item. Requiring the users to independently access an item in the bug tracking service at the same time can provide a choppy user experience in a team environment.

Therefore, examples of the disclosure can allow information, such as a URL, to be embedded into audio content played back by a voice assistant device and extracted by client devices that are associated with users. The URL can comprise a link to a service endpoint in which users of the enterprise are provided accounts and access. The URL can also comprise a link to an identity manager, which can provide content extracted from a service endpoint to the user's client device. The content provided to the user's client device can vary based upon the user's entitlements to content provided by the identity manager or the service endpoint.

Different users can have different privileges in various service endpoints, so the content provided by the endpoint to a particular user might vary from another. For example, a user that is assigned an issue in an issue or bug tracking system might have a different view that the user who made the assignment of the issue. As another example, one user in a CRM system might have read only access to a record while a different user might have write access to the record. The URL generated by examples of the disclosure that is embedded into the audio content that is played back using the voice assistant device can be a single URL that can be accessed by different users with different entitlements.

Additionally, the URL can be accessed by an application on client devices of respective users that is entered into a listening mode. The application in the listening mode can listen for embedded URL's and extract them from audio content played back by an assistant device. The application can then display content for the user on the client device that is retrieved from the URL.

Beginning with FIG. 1, shown is an example of a networked environment 100. The networked environment 100 includes a computing environment 103, a client device 106, a voice assistant device 107, a voice assistant service 109, and one or more service endpoints 111, which are in data communication with each other across a network 112. The network 112 includes wide area networks (WANs) and local area networks (LANs). These networks can include wired or wireless components or a combination thereof. Wired networks can include Ethernet networks, cable networks, fiber optic networks, and telephone networks, such as dial-up, digital subscriber line (DSL), and integrated services digital network (ISDN) networks. Wireless networks can include cellular networks, satellite networks, Institute of Electrical and Electronic Engineers (IEEE) 802.11 wireless networks (e.g., WI-FI®), BLUETOOTH® networks, microwave transmission networks, as well as other networks relying on radio broadcasts. The network 112 can also include a combination of two or more networks 112. Examples of networks 112 can include the Internet, intranets, extranets, virtual private networks (VPNs), and similar networks.

The computing environment 103 can include, for example, a server computer or any other system providing computing capability. Alternatively, the computing environment 103 can employ a plurality of computing devices that can be arranged, for example, in one or more server banks or computer banks or other arrangements. These computing devices can be located in a single installation or can be distributed among many different geographical locations. For example, the computing environment 103 can include a plurality of computing devices that together can include a hosted computing resource, a grid computing resource or any other distributed computing arrangement. In some cases, the computing environment 103 can correspond to an elastic computing resource where the allotted capacity of processing, network, storage, or other computing-related resources can vary over time.

Various applications or other functionality can be executed in the computing environment 103 according to various examples. The components executed in the computing environment 103, for example, can include an identity manager 113, an assistant connection service 116, one or more connectors 117, and an authentication service 119. In some examples, one or more service endpoints 111 can also be executed in the computing environment 103 in the case of service endpoints that are provided by the enterprise on the same computing resources of the enterprise. In some embodiments, however, one or more of the service endpoints 111 can be executed in a separate computing environment that is in communication with the computing environment 103 across the network 112.

Also, various data is stored in a data store 126 that is accessible to the computing environment 103. The data store 126 can be representative of a plurality of data stores, which can include relational databases, object-oriented databases, hierarchical databases, hash tables or similar key-value data stores, as well as other data storage applications or data structures. The data stored in the data store 126 is associated with the operation of the identity manager 113, the assistant connection service 116, the connector(s) 117, the authentication service 119, and one or more of the service endpoints 111, as well as potentially other applications or functional entities described later. This data can include one or more user accounts 129 and potentially other data.

The identity manager 113 can authenticate users and manage user authorizations or permissions to access applications, data, or other computing resources. For example, the identity manager 113 could correspond to a single sign-on portal that verifies a user's authentication credentials 133, issues a single sign-on token 136 that identifies the user, and verifies whether the user has the appropriate access permissions 139 to access one or more service endpoints 111. Examples of identity managers 113 include VMWARE's Identity Manager, Workspace ONE, or MICROSOFT's Active Directory Federation Services.

The authentication service 119 can retrieve and cache authentication data, such as authentication tokens 143 and refresh tokens 146, provided by various service endpoints 111. The cached authentication data can be used by the assistant connection service 116 to query the service endpoints 111 for information.

The assistant connection service 116 can facilitate authentication of users who are using an assistant device 107 with the identity manager 113. Additionally, the assistant connection service 116 can enable users to retrieve information from one or more service endpoints 111 for playback by a voice assistant device 107 that the user can associate with their user account 129 through the assistant connection service 116. The functionality of the assistant connection service 116 can also be implemented within a service endpoint 111.

A connector 117 can provide a mechanism for the assistant connection service 116 to communicate with a service endpoint 111. Each service endpoint 111 may provide an application programming interface (API) for communicating, querying, or otherwise interacting with the service endpoint 111, which can include different methods or functions with different parameters compared to other service endpoints 111. This can allow for the assistant connection service 116 to send a single, uniformly formatted query to one or more connectors 117. Each connector 117 is then responsible for using the information provided in the query from the assistant connection service 116 to invoke the appropriate functions provided by the API of the service endpoint 111. To add support for a new service endpoint 111, a new connector 117 can be created without needing to modify the assistant connection service 116 itself. Likewise, if a change is made to the API of the service endpoint 111, the connector 117 between the assistant connection service 116 and the federated service can be updated without having to modify the assistant connection service 116 itself.

A service endpoint 111 can be web application, web service, or other network facing application that can be accessed using a shared identity manager 113. A service endpoint 111 can also provide its own authentication flow or mechanism rather than rely upon a shared identity manager 113. One or more service endpoints 111 can be provided by the same provider or by different providers.

The user account 129 represents information associated with a user. The information can include one or more authentication credentials 133, one or more single sign-on tokens 136, and/or one or more access permissions 139 applied to the user account, as well as cached authentication tokens 143 and refresh tokens 146. Voice assistant associations 140 can specify one or more voice assistant devices 107 that are associated with a user account 129 and with which a user has authenticated. Once a voice assistant association 140 is established by a user, the assistant connection service 116 can provide data from a service endpoint 111 for playback by the voice assistant device 107. Other information about the user can also be stored as part of the user account 129, such as the user's name or contact information.

The authentication credentials 133 represent the credentials that a user can present to the identity manager 113 to authenticate the user's identity. Authentication credentials 133 can include a combination of a username and password, a cryptographic certificate, a one-time password, or a combination of several of authentication credentials 133 as part of a multi-factor authentication schema. Examples of one-time passwords can include a one-time password generated using a version of the time-based one-time password algorithm (TOTP) or a one-time password generated using the HMAC-based one-time password (HOTP) algorithm.

The single sign-on (SSO) token 136 is a software token generated by the identity manager 113 in response to a successful authentication of the user with the identity manager 113 using the authentication credentials 133. The SSO token 136 can be used to provide a client device 106 access to various service endpoints 111 on behalf of the authenticated user. Additionally, the SSO token 136 can be used by the assistant connection service 116 to access various service endpoints 111 on behalf of the authenticated user and a voice assistant device 107 associated with the user. In some instances, such as those implementing a version of the KERBEROS protocol, a separate SSO token 136 can be generated for each service endpoint 111 that the client device 106 attempts to access on behalf of the user. In other instances, the single SSO token 136 can be generated and used to provide the client device 106 with access to several of the service endpoints 111. Although each of the service endpoints 111 can have a different set of authentication credentials 133 linked to the user account 129, such as a different user name and password combination, the SSO token 136 allows the user to authenticate once with the identity manager 113 in order to use each of the service endpoints 111 instead of having to authenticate with each of the service endpoints 111 separately.

The access permissions 139 represent computing resources that the user account is authorized to access. For example, the access permissions 139 can indicate that a user account is permitted to access some service endpoints 111 but is prohibited from accessing other service endpoints 111. As another example, the access permissions 139 can indicate that the user account 129 is allowed to access certain features of a service endpoint 111 but prohibited from accessing other features. For example, if one of the service endpoints 111 that a user was permitted to access was a customer relationship management (CRM) service, the user might have permission to access his or her own contacts but be prohibited from accessing the sales contacts of other users.

An authentication token 143 is a token provided by one of the service endpoints 111 in response to a successful authentication with the service endpoint 111. The authentication token 143 represents that a user account 129 is currently authenticated by the service endpoint 111 and authorized to access or otherwise interact with the service endpoint 111 in some capacity. For security purposes, the authentication token 143 often has a time-limit associated with it, such as 1 hour, 3 hours, 6 hours, 8 hours, or some other period of time). Once the time-limit has expired, the authentication token 143 can no longer be used to prove current authentication status of the user account 129 with the service endpoint 111. The authentication token 143 can be provided, for example, as part of an authentication exchange using a version of the OAUTH protocol.

A refresh token 146 is a token provided by one of the service endpoints 111 in response to a successful authentication with the service endpoint 111. The refresh token 146 can be used to acquire a new authentication token 143 once a current or previous authentication token 143 expires. The refresh token 146 often has a much longer time-limit associated with it, such as 1 day, 1 week, 30 days, 3 months, or 1 year, which allows for the refresh token 146 to be used to acquire a series of authentication tokens 143 after an initial successful authentication. In the event that a user's access is revoked, the refresh token 146 can be marked invalid, preventing the refresh token 146 from being used to acquire new authentication tokens 143. The refresh token 146 can be provided, for example, as part of an authentication exchange using a version of the OAUTH protocol.

A URL 147 represents a URL generated by or on behalf of the assistant connection service 116. The URL 147 can link to the identity manager 113 or a service endpoint 111. The URL 147 can link to content that is related to audio content that is read aloud by the voice assistant device 107. The URL 147 can be extracted from content provided to the voice assistant device 107 by the assistant connection service 116. The URL 147 can link to a service endpoint 111 that federates its authentication to the identity manager 113 so that the users accessing the URL 147 from a respective client device 106 obtain respective content that is personalized to the entitlements in the service endpoint 111 associated with their respective user accounts 129.

The URL 147 can be generated as a temporary one-time URL that expires after a time period. The URL 147 can also link to a page generated for viewing within a special purpose application on the client device 106 that is in a listening mode. The application on the client device 106 can display the content that is tailored to the user depending upon the user's entitlements within the service endpoint 111. In some cases, the URL 147 can be pushed to an application as a push notification, which can remove the need for the application on the client device 106 to be run in a listening mode. As a push notification is received by the client device 106, the user can follow the link or interact with the push notification, which can cause the URL 147 to be opened in a special purpose application or a browser. In some examples, the URL 147 may not be a link that is decipherable by a browser or any other application other than the special purpose application.

A service endpoint 111 can be associated with a federated user account 131. A user with a user account 129 may also have multiple federated user accounts. For example, a user may have one federated user account for each service endpoint 111 that the user is registered or enrolled with. As another example, the user may have multiple federated user accounts for a service endpoint 111 (e.g., a personal federated user account and a separate federated user account for business or professional purposes). The federated user account can be associated with an SSO token 136 and an authentication token 143.

The client device 106 is representative of a plurality of client devices 106 that can be coupled to the network 112.

The client device 106 can include, for example, a processor-based system such as a computer system. Examples of these computer systems can include a personal computer (e.g., a desktop computer, a laptop computer, or similar device), a mobile computing device (e.g., personal digital assistants, cellular telephones, smartphones, web pads, tablet computer systems, music players, portable game consoles, electronic book readers, and similar devices), or other devices with like capability. The client device 106 can include one or more displays 149, such as liquid crystal displays (LCDs), gas plasma-based flat panel displays, organic light emitting diode (OLED) displays, electrophoretic ink ("E-ink") displays, projectors, or other types of display devices. In some instances, the display can be a component of the client device 106 or can be connected to the client device 106 through a wired or wireless connection.

The client device 106 can be configured to execute various applications such as one or more client applications 153. The client application 153 can cause a user interface 156 to be rendered on the display 149. The client application 153 can represent various types of applications executable by the client device 106. For example, the client application 153 could be a web browser and the user interface 156 could include a web page rendered within a browser window. As another example, the client application 153 could be an email application and the user interface 156 could represent a graphical user interface for viewing, editing, and composing emails.

Additionally, the client application 153 can represent an application that allows a user to enter a listening mode that can listen for audio content played back by a voice assistant device 107 and extract URLs 147. The client application 153 can be instrumented to extract URLs 147 and display content retrieved from the URLs 147 in the client application 153 or redirect execution to another application to retrieve content retrieved from a URL 147.

The voice assistant device 107 represents a smart speaker or any device that has a microphone and audio playback capability to provide a voice assistant experience. A voice assistant experience means an experience in which a user can provide spoken commands or requests that are captured by one or more microphones integrated with or in communication with the voice assistant device 107, and the voice assistant device 107 play back audio using a speaker in response to the spoken commands or requests. For example, a user can ask the voice assistant device 107 to play music or retrieve information from the Internet, and the voice assistant device 107 can cause playback of the requested music or information through an integrated speaker or an audio playback device in communication with the voice assistant device 107.

The voice assistant service 109 can communicate with the voice assistant device 107 to process voice commands and facilitate retrieval of information for playback through the voice assistant device 107. The voice assistant service 109 can perform voice recognition or speech-to-text conversion on audio captured by the voice assistant device 107, identify a command or action to perform in response to the captured audio, and response to the voice assistant device 107 audio that should be played back through the voice assistant device 107. The voice assistant service 109 can also provide an API so that third parties can create applications or extend the capabilities of the voice assistant device 107. These applications or capabilities can be implemented within a cloud-based voice assistant service 109 so that the functionality does not need to be implemented within every voice assistant device 107 that is deployed for extended capabilities to be available to every user.

In the context of this disclosure, the assistant connection application 159 can facilitate authentication of a user with the assistant connection service 116 using the voice assistant device 107. Upon authentication, the assistant connection application 159 can retrieve data from the assistant connection service 116 or service endpoints 111 and cause at least a portion of the data to be played back through the voice assistant device 107. Accordingly, various commands can be implemented in the assistant connection application 159, such as commands to retrieve or make changes to data in a user's calendar, email, or other federated services.

Also in the context of this disclosure, any functionality discussed as being performed by the assistant connection application 159 or assistant connection service 116 can be performed in a single application or service. Additionally, any functionality discussed as being performed by the assistant connection application 159 can be performed instead by the assistant connection service 116 or vice-versa.

Next, a general description of the operation of the various components of the networked environment 100 is provided. First, a user can cause the voice assistant device 107 to play back content retrieved from the assistant connection application 159 or assistant connection service 116 on behalf of the user. The content can be audio content that is created from a text source. The text source can be retrieved from a service endpoint 111, such as a user's email or calendar. The audio content can be created from a text source by performing a text-to-speech transcription of the content or by creating an abridged summary of a text source and converting the abridged summary to audio content that can be played back through the voice assistant device 107.

The assistant connection application 159 can also obtain or generate URLs 147 associated with the audio content. The one or more URLs 147 can be extracted from the text source that is generated for playback by the voice assistant device 107. The URLs 147 can be generated from an abridged summary of a text source that is played back by the voice assistant device 107. The URLs 147 can link to an item or content in a service endpoint 111 for which the identity manager 113 acts as a federated authentication mechanism for the service endpoint 111. Accordingly, the service endpoint 111 can display content or context for the item that is personalized for the user accessing the content using the URL 147.

For example, if the voice assistant device 107 is playing back audio content corresponding to a user's email message, the assistant connection application 159 can extract a URL 147 embedded in the email message and in turn embed the URL 147 into the audio content that is played back by the voice assistant device 107. The URL 147 can be embedded into the audio content using an audio watermarking or through steganographic techniques that allow data to be inaudibly or imperceptibly (to most human hearing) embedded into audio.

In one example, the assistant connection application 159 can cause the voice assistant device 107 to play back a command that instructs the user to launch a particular application into a listening mode. The client application 153 could implement the listening mode, as one example. In this scenario, the client application 153, once launched into the listening mode, can listen for embedded URLs 147 in audio content play back by the voice assistant device 107 and retrieve the content from the URLs 147 as they are detected.

The URLs 147 can be links to a service endpoint 111 that federates its authentication to the identity manager 113.

A user of the client device 106 can authenticate with the identity manager 113. For example, the identity manager 113 can generate and send a web page to a browser executing on the client device 106. The user can use the web page to submit his or her authentication credentials 133 to the identity manager 113. The identity manager 113 can then determine whether the submitted authentication credentials 133 match the authentication credentials 133 stored for the user account 129. If the authentication credentials 133 match, the identity manager 113 determines that the user is authenticated from the client device 106. In response, the identity manager 113 can generate an SSO token 136 to represent the authenticated user. In some embodiments, the identity manager 113 can also notify the authentication service 119 of the authentication event. In these embodiments, the notification can include a user identifier and the SSO token 136. In other embodiments, the identity manager 113 can instead provide the SSO token 136 to the client application 153 executing on the client device 106. In these embodiments, the client application then provides the SSO token 136 to the authentication service 119. Because the user can authenticate his or her identity from the client device 106 as described above, after following the URL 147, the user is provided content from the service endpoint 111 that reflects the user's entitlements or customizations in the service endpoint 111. The customized content can include a content page or content snippet that allows the user to take an action on an item in the service endpoint 111, such as closing out a bug, adding comments, or performing other actions permitted by a service endpoint 111 for a user.

The URLs 147 can be embedded such they are timecoded or synchronized with the play back of audio content to which they are related. For example, as the agenda of a meeting is played back by the voice assistant device 107, the assistant connection application 159 can embed a URL 147 that links to content associated with an agenda item as that item is played back by the voice assistant device 107. As the next agenda item is played back by the voice assistant device 107, the next URL 147 that is associated with the next agenda item can be embedded in the audio content.

Figure 2:
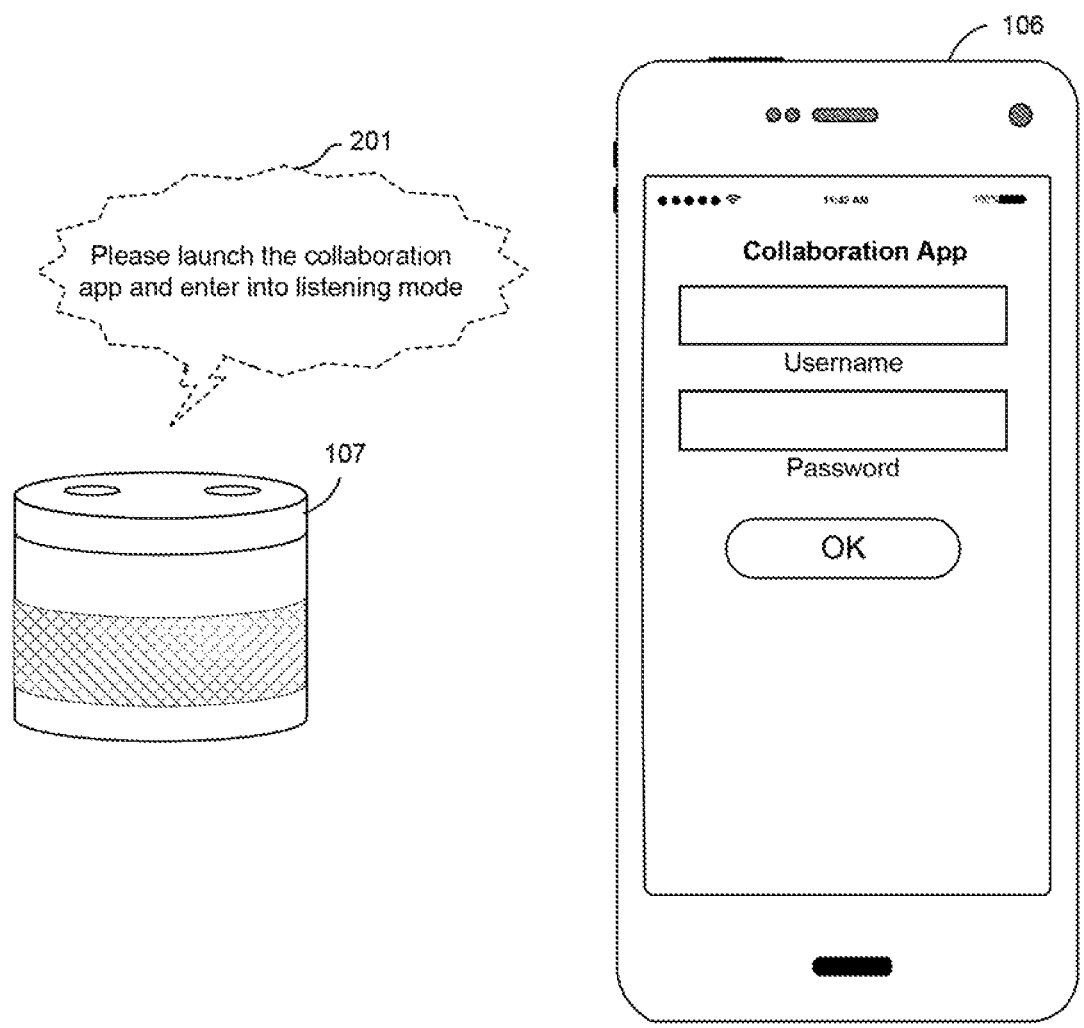
FIG. 2 depicts a scenario according to examples of the disclosure.

Referring next to FIG. 2, shown is a scenario that illustrates how interactions between a user, the voice assistant device 107, and the user's client device 106 can operate. In the scenario shown, the user has invoked the functionality in the voice assistant device 107 that is provided by the assistant connection application 159. Again, the assistant connection application 159 can be implemented using APIs provided by an assistant platform on which the voice assistant device 107 runs. The assistant connection application 159 can be implemented as a third party application, skill, or capability of the voice assistant device 107 that extends the capability of the voice assistant device 107 to enable users to obtain data from service endpoints 111 associated with the user account 129.

In FIG. 2, the user can ask the voice assistant device 107 to launch or invoke the assistant connection application 159 by using a keyword linked to the assistant connection application 159 within an assistant ecosystem in which the voice assistant device 107 operates. The user can request that the voice assistant device 107 retrieve data from the user's calendar, email, task list, or another service endpoint 111 for which access is authenticated by the identity manager 113. The user can also request that the voice assistant device 107 read other content accessible to the device, such as text in a calendar item that is associated with a particular meeting room or other resource.

In some scenarios, upon launching the assistant connection application 159, the user can either request that the assistant connection application 159 authenticate her user account 129 or access data from a service endpoint 111 linked to her enterprise account. The assistant connection application 159 can identify the voice assistant device 107 from which the request is originating and determine whether the voice assistant device 107 is linked to a user account 129. If the voice assistant device 107 is not linked with a voice assistant association 140 of a user account 129, the assistant connection application 159 can facilitate authentication of the user either with or without the assistant of an application running on the user's client device 106.

Once authenticated, the user can request playback of various content. The assistant connection application 159 can determine whether playback of certain audio content is associated with other information or links related to the audio content that can be viewed using the client device 106 of the user. The assistant connection application 159 can make such a determination by identifying URLs 147 embedded in a text source. If there is a URL 147 embedded in the text source of content requested by the user to be played back as audio content, the assistant connection application 159 can embed the URL 147 into the audio content.

Additionally, the assistant connection application 159 can identify content that might be better or more easily viewed on a device with a display and generate a URL 147 that points to the content that is embedded into the audio content played back through the voice assistant device 107. For example, if imagery, video, or other visual content is in the text source associated with the audio content, the assistant connection application 159 can retrieve the visual content, store the visual content in a location accessible to users of the enterprise, and generate a URL 147 that points to the location in which the visual content is stored. The URL 147 can then be embedded into the audio content. As another example, a text source for content contains a link to a service endpoint 111, the assistant connection application 159 can generate a URL 147 that points to the location in which the content in the service endpoint 111 is stored.

Accordingly, if the assistant connection application 159 determines that a URL 147 is to be embedded into audio content read aloud by the voice assistant device 107, the assistant connection application 159 can cause the voice assistant device 107 to play back a message 201 instructing users to launch the client application 153 in a listening mode. The listening mode of the client application 153 can enable the client application 153 to utilize the one or more microphones associated with the client device 106 to listen for or capture audio content in its proximity or in proximity to the voice assistant device 107.

Accordingly, users can be required to authenticate using the client application 153 with the identity manager 113 to verify that their respective client devices 106 are authorized to extract URLs 147 that are embedded in audio content played back by the voice assistant device 107.

Figure 3:
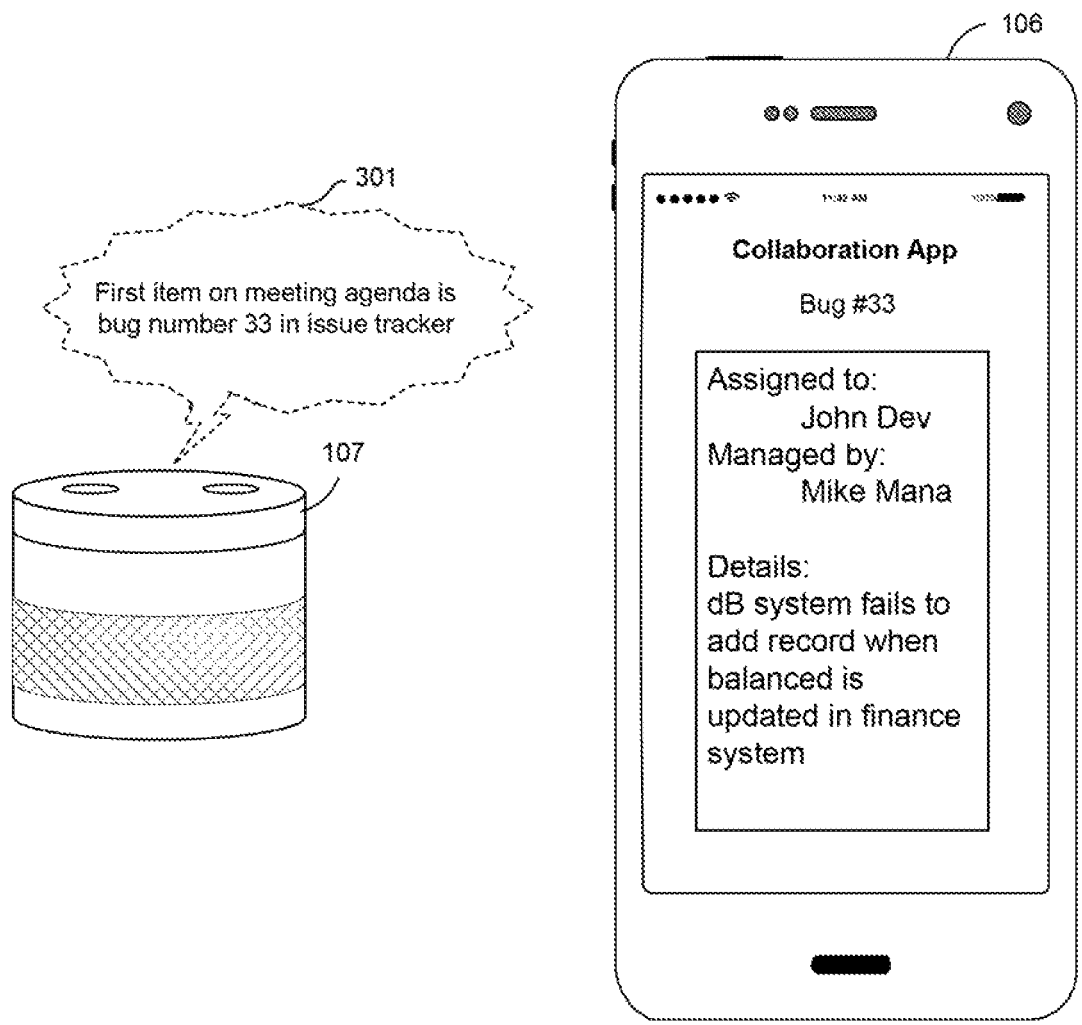
FIG. 3 depicts a scenario according to examples of the disclosure.

Continuing the scenario shown in FIG. 2, reference is now made to FIG. 3. As shown in FIG. 3, the client application 153 can be instrumented to extract embedded URLs 147 from the audio content 301 that the assistant connection application 159 causes the voice assistant device 107 to play back. In one example, the client application 153 can extract the embedded URL 147 from the audio content 301, retrieve content from the URL 147, and display the content within the client application 153. In other examples, the client application 153 can redirect execution to a browser, which can retrieve content from the URL 147 and render it for display on the client device 106.

The URL 147 can point to a service endpoint 111 that federates its authentication to the identity manager 113 associated with the enterprise. Accordingly, the content retrieved from a first user's client device 106 can be different from a second user's client device 106 if the respective users' entitlements of permissions in the service endpoint 111 are different from one another. As a result, the content retrieved from service endpoints 111 that is displayed by the client device 106 running the client application 153 can vary for different users even though the client application 153 extracts and visits the same URL 147 from their respective client devices 106.

As the voice assistant device 107 continues playback of audio content, there can be additional URLs 147 embedded in the audio content that are also played back by the voice assistant device 107. As the client application 153 in listening mode extracts additional URLs 147, the content displayed by the client application 153 can be updated with the content retrieved from the URLs 147. In this way, the client application 153 can be synchronized with the audio content that is played back by the voice assistant device 107.

In some implementations, rather than require the client application 153 to enter into a listening mode to extract a URL 147, the assistant connection application 159 can cause a push notification with the URL 147 to be sent to client devices 106 belonging to users in proximity to the voice assistant device 107. In this scenario, users can check into a meeting or gathering associated with the voice assistant device 107 by tapping a near-field communication tag with their respective client devices 106, accepting a calendar invitation associated with the gathering, or through a location tracking mechanism such as a Bluetooth or location beacon.

Figure 4:
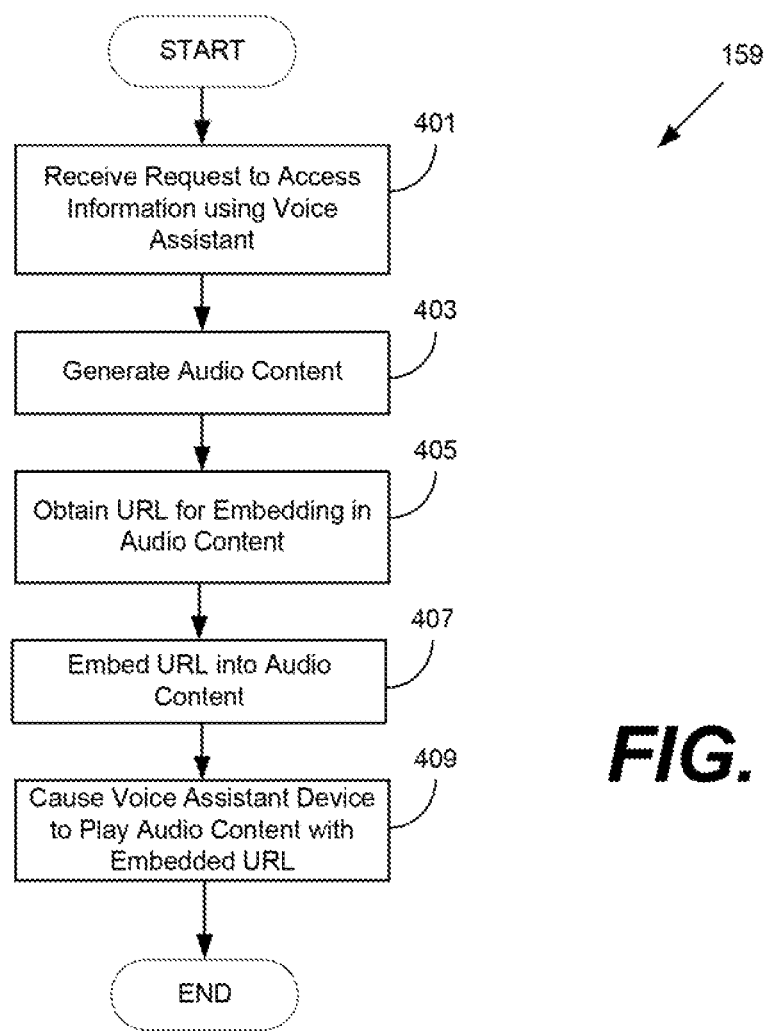
FIG. 4 depicts a scenario according to examples of the disclosure.

FIG. 4 is a flowchart depicting an example of the operation of a portion of the assistant connection application 159. It is understood that the flowchart of FIG. 4 provides merely an example of the many different types of functional arrangements that can be employed to implement the portion of the assistant connection application 159 as described herein. As an alternative, the flowchart of FIG. 4 can be viewed as depicting an example of elements of a method implemented by the assistant connection application 159 in some implementations. The functionality shown in FIG. 4 can also be implemented in whole or in part by the assistant connection service 116.

Beginning at step 401, the assistant connection application 159 can receive a request to access information using a voice assistant device 107. The information can be associated with a particular user account or an event, such as a meeting in a particular room in an enterprise. In one example, the content could be an email message or a meeting agenda associated with a calendar event. The information can be associated with a text source that can be played back by the voice assistant device 107.

At step 403, the assistant connection application 159 can generate audio content for playback by the voice assistant device 107. The audio content can be created from a text source by performing a text-to-speech transcription of the content or by creating an abridged summary of a text source and converting the abridged summary to audio content that can be played back through the voice assistant device 107.

At step 405, the assistant connection application 159 can obtain a URL 147 that can be embedded into the audio content. The URL 147 can be extracted from the text source or generated by the assistant connection application 147 as a temporary one-time URL that expires after a time period. The URL 147 can also link to a page generated for viewing within the client application 153 that is in a listening mode. The client application 153 application on the client device 106 can display the content that is tailored to the user depending upon the user's entitlements within the service endpoint 111. In some examples, the URL 147 may not be a link that is decipherable by a browser or any other application other than the client application 153.

At step 407, the URL 147 can be embedded into the audio content generated by the assistant connection application 159 for playback by the voice assistant device 107. The URL 147 can be embedded into the audio content using an audio watermarking or through steganographic techniques that allow data to be inaudibly or imperceptibly (to most human hearing) embedded into audio. In some cases, the URL 147 can be encrypted so that only certain devices are able to decrypt the URL 147.

At step 409, the assistant connection application 159 can cause the audio content with the embedded URL 147 to be played back by the voice assistant device 107. In some examples, the assistant connection application 159 can also cause the voice assistant device 107 to play back a message requesting that users in proximity to the voice assistant device 107 execute the client application 153 in a listening mode that is instrumented to extract URLs 147 embedded into audio content. Thereafter, the process can proceed to completion.

FIG. 5 is a flowchart depicting an example of the operation of a portion of the client application 153. It is understood that the flowchart of FIG. 5 provides merely an example of the many different types of functional arrangements that can be employed to implement the portion of the client application 153 as described herein. As an alternative, the flowchart of FIG. 5 can be viewed as depicting an example of elements of a method implemented by the client application 153 in some implementations.

Beginning at step 501, the client application 153 obtain a request to enter a listening mode. The request can be obtained from a user activating a listening mode in the client application 153. In some examples, the listening mode can be automatically launched in the client application 153 by receiving a command from a management service with which the client device 106 is enrolled as a managed device.

At step 503, after invoking the listening mode, the client application 153 can extract an embedded URL 147 in audio content played back by the voice assistant device 107. The URL 147 can link to content that is related to the audio content being played back by the voice assistant device 107. The URL 147 can be embedded into the audio content using an audio watermarking or through steganographic techniques that allow data to be inaudibly or imperceptibly embedded into audio. In some cases, the URL 147 can be encrypted, so the client application 153 can decrypt the URL 147.

At step 505, the client application 153 can retrieve content from the URL 147. In one example, the client application 153 can extract the embedded URL 147 from the audio content 301, retrieve content from the URL 147, and display the content within the client application 153. In other examples, the client application 153 can redirect execution to a browser, which can retrieve content from the URL 147 and render it for display on the client device 106.

The URL 147 can point to a service endpoint 111 that federates its authentication to the identity manager 113 associated with the enterprise. Accordingly, the content retrieved from a first user's client device 106 can be different from a second user's client device 106 if the respective users' entitlements of permissions in the service endpoint 111 are different from one another. As a result, the content retrieved from service endpoints 111 that is displayed by the client device 106 running the client application 153 can vary for different users even though the client application 153 extracts and visits the same URL 147 from their respective client devices 106.

At step 507, the client application 153 can render the retrieved content. Thereafter, the process proceeds to completion.

The flowcharts of FIGS. 4-5 show examples of the functionality and operation of implementations of components described herein. The components described herein can include hardware, software, or a combination of hardware and software. If embodied in software, each element can represent a module of code or a portion of code that includes program instructions to implement the specified logical function(s). The program instructions can be embodied in the form of source code that includes human-readable statements written in a programming language or machine code that includes machine instructions recognizable by a suitable execution system, such as a processor in a computer system or other system. If embodied in hardware, each element can represent a circuit or a number of interconnected circuits that implement the specified logical function(s).

Although the flowcharts of FIGS. 4-5 show a specific order of execution, it is understood that the order of execution can differ from that which is shown. The order of execution of two or more elements can be switched relative to the order shown. Also, two or more elements shown in succession can be executed concurrently or with partial concurrence. Further, in some examples, one or more of the elements shown in the flowcharts can be skipped or omitted. In addition, any number of counters, state variables, warning semaphores, or messages could be added to the logical flow described herein, for purposes of enhanced utility, accounting, performance measurement, or troubleshooting aid. It is understood that all variations are within the scope of the present disclosure.

The components described herein can each include at least one processing circuit. The processing circuit can include one or more processors and one or more storage devices that are coupled to a local interface. The local interface can include a data bus with an accompanying address/control bus or any other suitable bus structure. The one or more storage devices for a processing circuit can store data or components that are executable by the one or processors of the processing circuit.

The components described herein can be embodied in the form of hardware, as software components that are executable by hardware, or as a combination of software and hardware. If embodied as hardware, the components described herein can be implemented as a circuit or state machine that employs any suitable hardware technology. This hardware technology can include one or more microprocessors, discrete logic circuits having logic gates for implementing various logic functions upon an application of one or more data signals, application specific integrated circuits (ASICs) having appropriate logic gates, programmable logic devices (e.g., field-programmable gate array (FPGAs), and complex programmable logic devices (CPLDs)).

Also, one or more or more of the components described herein that includes software or program instructions can be embodied in any non-transitory computer-readable medium for use by or in connection with an instruction execution system such as a processor in a computer system or other system. The computer-readable medium can contain, store, or maintain the software or program instructions for use by or in connection with the instruction execution system.

The computer-readable medium can include physical media, such as magnetic, optical, semiconductor, or other suitable media. Examples of a suitable computer-readable media include, but are not limited to, solid-state drives, magnetic drives, and flash memory. Further, any logic or component described herein can be implemented and structured in a variety of ways. One or more components described can be implemented as modules or components of a single application. Further, one or more components described herein can be executed in one computing device or by using multiple computing devices.

It is emphasized that the above-described examples of the present disclosure are merely examples of implementations to set forth for a clear understanding of the principles of the disclosure. Many variations and modifications can be made to the above-described examples without departing substantially from the spirit and principles of the disclosure. All modifications and variations are intended to be included herein within the scope of this disclosure.

What is claimed is:

1. A system comprising:
    at least one computing device;
    at least one application that, when executed by the at least one application, causes the at least one computing device to at least:
        receive a request to access a voice assistant service provided by the at least one application;
        generate audio content associated with the request for playback through a voice assistant device;
        obtain a uniform resource locator (URL), the URL linking to respective additional content in a service endpoint, wherein the URL comprises a link to the service endpoint, and the service endpoint federates authentication to an identity provider in which a user account associated with the client device is stored;
        embed the URL into the audio content, wherein the URL detectable using a client device in proximity to a voice assistant device; and
        cause the audio content to be played back by a speaker system of the voice assistant device, wherein the client device in proximity to the voice assistant device extracts the URL and accesses the respective additional content in the service endpoints second client device in proximity to the voice assistant device extracts the URL, and the service endpoint provides respective additional content to the second client device that is different from the respective additional content provided to the client device.

2. The system of claim 1, wherein the URL is inaudibly embedded into the audio content.

3. The system of claim 1, wherein the URL is embedded into the audio content using an audio watermarking or a steganographic process.

4. The system of claim 1, wherein the at least one application provides an authentication token corresponding to user account to the service endpoint on behalf of the user account.

5. A non-transitory computer-readable medium comprising machine-readable instructions, wherein the instructions, when executed by at least one processor, cause a computing device to at least:

receive a request to access a voice assistant service provided by the at least one application;

generate audio content associated with the request for playback through a voice assistant device;

obtain a uniform resource locator (URL), the URL linking to respective additional content in a service endpoint, wherein the URL comprises a link to the service endpoint, and the service endpoint federates authentication to an identity provider in which a user account associated with the client device is stored;

embed the URL into the audio content, wherein the URL detectable using a client device in proximity to a voice assistant device; and cause the audio content to be played back by a speaker system of the voice assistant device, wherein the client device in proximity to the voice assistant device extracts the URL and accesses the respective additional content in the service endpoint, a second client device in proximity to the voice assistant device extracts the URL, and the service endpoint provides respective additional content to the second client device that is different from the respective additional content provided to the client device.

6. The non-transitory computer-readable medium of claim 5, wherein the URL is inaudibly embedded into the audio content.

7. The non-transitory computer-readable medium of claim 5, wherein the URL is embedded into the audio content using an audio watermarking or a steganographic process.

8. The non-transitory computer-readable medium of claim 5, wherein the URL comprises a link to the service endpoint, and the service endpoint federates authentication to an identity provider in which a user account associated with the client device is stored.

9. The non-transitory computer-readable medium of claim 8, wherein the at least one application provides an authentication token corresponding to user account to the service endpoint on behalf of the user account.

10. A method comprising:

receiving a request to access a voice assistant service provided by the at least one application;

generating audio content associated with the request for playback through a voice assistant device;

obtaining a uniform resource locator (URL), the URL linking to respective additional content in a service endpoint, wherein the URL comprises a link to the service endpoint, and the service endpoint federates authentication to an identity provider in which a user account associated with the client device is stored;

embedding the URL into the audio content, wherein the URL detectable using a client device in proximity to a voice assistant device; and causing the audio content to be played back by a speaker system of the voice assistant device, wherein the client device in proximity to the voice assistant device extracts the URL and accesses the respective additional content in the service endpoint, a second client device in proximity to the voice assistant device extracts the URL, and the service endpoint provides respective additional content to the second client device that is different from the respective additional content provided to the client device.

11. The method of claim 10, wherein the URL is inaudibly embedded into the audio content.

12. The method of claim 10, wherein the URL is embedded into the audio content using an audio watermarking or a steganographic process.

13. The method of claim 10, further comprising providing an authentication token corresponding to user account to the service endpoint on behalf of the user account.

\* \* \* \* \*